Feb. 9, 1932.  R. G. WULFF  1,843,965
PROCESS OF MAKING ACETYLENE AND OTHER PRODUCTS BY THERMAL
TREATMENT OF HYDROCARBONS AT ATMOSPHERIC PRESSURE
Filed Oct. 1, 1928  2 Sheets-Sheet 1

INVENTOR:
ROBERT G. WULFF,
BY
ATTORNEY.

Patented Feb. 9, 1932

1,843,965

UNITED STATES PATENT OFFICE

ROBERT G. WULFF, OF LOS ANGELES, CALIFORNIA

PROCESS OF MAKING ACETYLENE AND OTHER PRODUCTS BY THERMAL TREATMENT OF HYDROCARBONS AT ATMOSPHERIC PRESSURE

Application filed October 1, 1928. Serial No. 309,547.

This invention relates to a process of making acetylene, or a gas rich in acetylene, from natural gas or artificial gas, carbureted or uncarbureted.

The process herein disclosed is somewhat similar to the process disclosed in my co-pending applications Serial No. 281,406, filed May 29, 1928, Serial No. 160,341, filed January 11, 1927, and Serial No. 206,745, filed July 18, 1927, each of which this application is a continuation in part, with this important difference from the processes therein disclosed, that no reduction in pressure or presence of diluent is necessary. In other words, my present process will operate at atmospheric pressure without a diluent being present and still furnish a high yield of acetylene and other valuable products.

Fundamentally, the process is one of exposing to a high heat for a short period of time, at approximately atmospheric pressure, an undiluted mixture of hydrocarbons preferably rich in those higher than methane, and thereafter quickly cooling the reaction products. As will be hereinafter shown, there is good evidence to lead one to believe that acetylene is formed largely from the higher paraffin and olefine hydrocarbons and ethylene, and only in a very slight degree from methane. In order to increase the yield of acetylene, therefore, I may enrich natural or artificial gas or methane with higher hydrocarbons before subjecting it to the heat treatment. One way of doing this is to bubble the gas through gasoline or other carbureting liquid to be used, and another is to spray said liquid into the gas. In whatever manner this carburetion is carried out the essential thing is to form a mixture of the natural gas and the carbureting liquid, which mixture should be a true gas. Therefore, for cases of high enrichment or the use of a heavy carbureting medium, or both, the resulting mixture might have to be at a temperature substantially higher than that of the room in order to maintain the condition of good homogeneity. It is of considerable advantage to the efficiency of the process to have thorough mixing before giving thermal treatment which forms acetylene. Excepting acetylene, any other hydrocarbon, besides gasoline, heavier than methane, such as casing-head, ethane, ethylene, kerosene, benzine, ligroin, benzol or toluol can be used for enrichment or carburetion, separately or in combination, and will materially increase the acetylene yield.

For whatever mixture to be so heat-treated for formation of acetylene, there is an optimum time of heating, or what is equivalent, an optimum rate of flow of said mixture through the heat-treating zone, which rate will depend on the internal volume of said heating zone. This time of heating or cracking varies with the temperature, and will be much shorter for higher temperatures. The yield of acetylene is also higher as is the percentage of acetylene in the gas formed, the higher the temperature employed. Of course, this is granting that the best rate of flow or time of heating is in each case employed. I have found that if the raw material is heated too long, the acetylene after forming will again decompose, and the yield will be low, regardless of the temperature employed. I have found, therefore, that the formation of acetylene is transient in every case, and the treated gas must be withdrawn and cooled before said acetylene so formed again decomposes.

Referring now to the drawings,—

Figure 1:
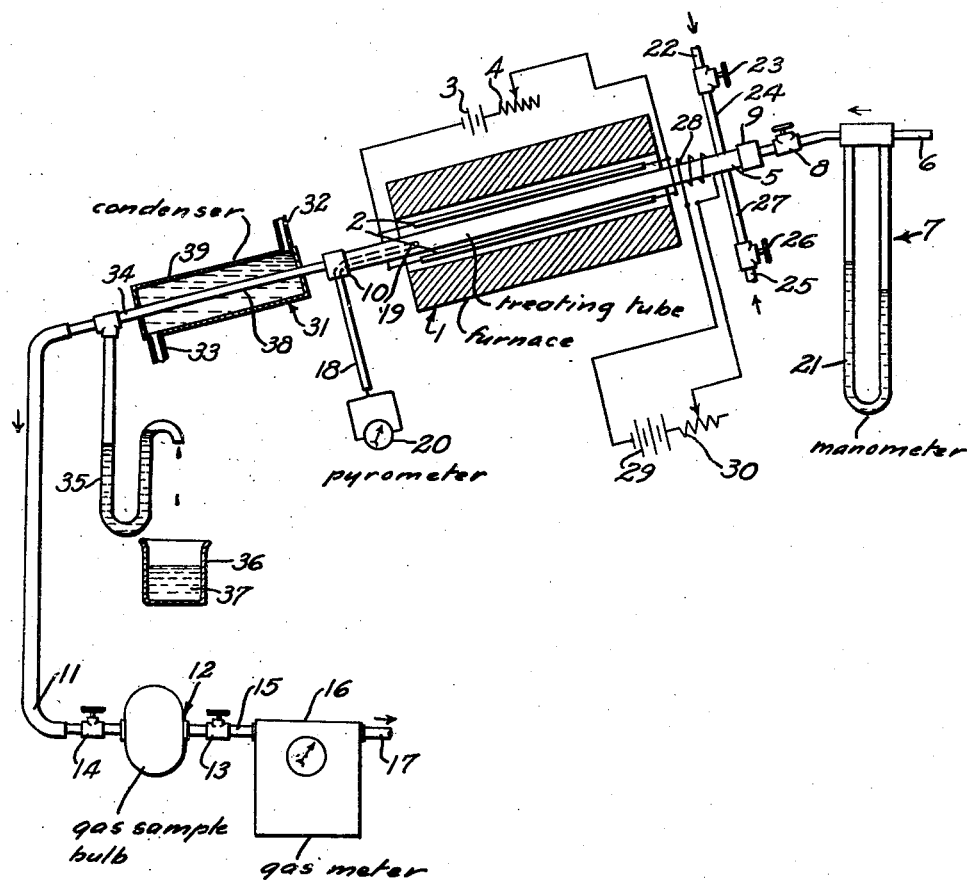
Fig. 1 shows a side elevation of a laboratory apparatus suitable for carrying out my process.

In Fig. 1, numeral 1 is a cylindrical furnace with a co-axial core in which the heat-treating tube is contained. Said furnace contains carborundum heating elements 2 which are supplied with electric energy by a battery or equivalent 3. 4 is a rheostat for controlling the temperature within the furnace. 6 is a source of natural or artificial gas or methane under a few pounds over atmospheric pressure, which is connected to an orifice type gas meter 7. The outlet end of the meter 7 connects to a needle valve 8 which in turn leads to a packing-gland 9, said gland effecting a gas-tight connection to a heat-treating tube 5. 22 is a source of steam or water which is regulated by means of a needle valve 23. Said steam or water then is led through a pipe 24 to the inside of the tube 5. 25 is a source of carbureting hydrocarbon, which may enter as a gas, a spray, a liquid, or a vapor in a heated condition so as to enter as a pure gas. A needle valve 26 is adapted to control the rate of flow of said hydrocarbon, which then passes through a pipe 27 and enters tube 5. About the inlet end of the tube 5 is a heating coil 28 fed by a source of electrical energy 29, while the temperature of said coil is controlled by a rheostat 30. The heating coil 28 is applied to the tube 5 preferably after the steam and the carbureting liquid have come in contact with the natural gas or methane stream, and before the same has reached the zone heated by the furnace 1.

10 is a packing-gland similar to 9 for making gas-tight connection between the tube 5 and an inner tube 38 of a Liebig condenser 31. Said gland also receives in gas-tight manner a thermocouple 18 insulated therefrom, supporting the same as shown, with the sensitive junction of the thermocouple suspended in the gas stream opposite the outlet end of the heating elements 2 of the furnace 1. 20 indicates a pyrometer which is in communication with the thermocouple. The condenser 31 receives cooling fluid into a jacket 39 at inlet 33, and rejects the same at outlet 32. The gas outlet end of the condenser 31 connects by means of a rubber tube 11 to a gas sample bulb 12. The outlet end of the same in turn, and by means of another rubber tube 15, communicates with a gas meter 16. Near the outlet end of a tube 34 is a T connection formed into a U-tube 35 which receives condensed steam and oil. Said condensate accumulates in container 37 and the U-tube serves as a seal to provide for the removal of said condensate while there is still maintained a head or pressure on the gas to force its passage through the sample bulb and the gas meter mentioned.

Figure 2:
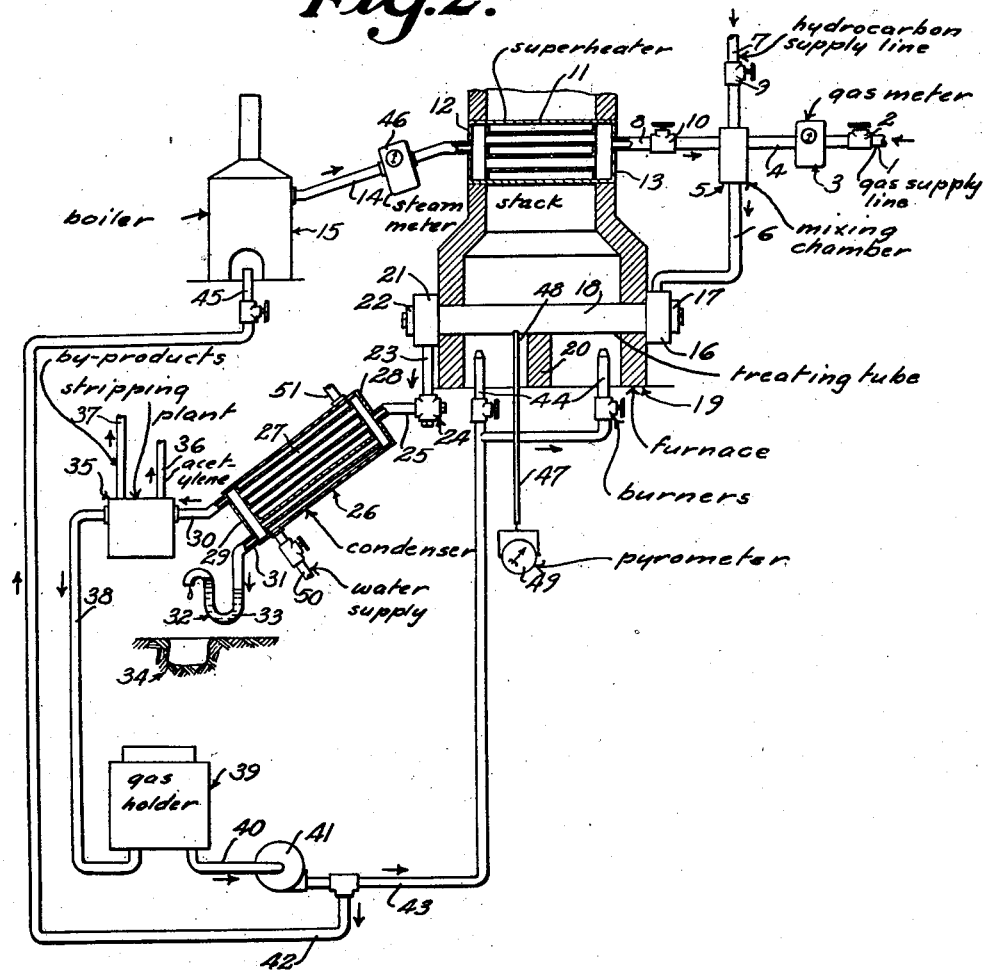
Fig. 2 shows a side elevation, partly in section and more or less diagrammatically, of an industrial apparatus suitable for operating my process.

Referring now to Fig. 2, 1 is a natural or artificial gas or methane supply-line under a few pounds pressure above atmospheric, leading to a valve 2, thence to a gas meter 3, and from there to a mixing chamber 5. 7 indicates a hydrocarbon supply-line for carburetion. Said supply is controlled by a valve 9 and then admitted to the mixing chamber 5. 15 is a boiler which supplies steam which is metered at 46, and then passes through a superheater 11 which consists of a plurality of tubes interconnected at each end, as at 12, with headers. The outlet end of said superheater passes the steam to a pipe 8 which leads it to a controlling valve 10. The steam thereafter enters the mixing chamber 5 mentioned. The outlet end of the mixing chamber then communicates through a pipe 6 with a packing-gland 16 making gas-tight connection with the heat-treating tube 18 set within a furnace 19. The superheater 11 is set in the stack of said furnace to be heated by the waste gases of the same. The far end of the tube 18 is fitted with a packing-gland 21, similar to 16, in gas-tight manner. These glands carry removable caps 17 and 22 for cleaning of the tube 18 when necessary. The gland 21 communicates with a tube 25 leading to a condenser 26 through an elbow connection having removable caps 24 for cleaning as needed.

A thermocouple 47 with sensitive junction 48 near the outer wall of the tube 18 is connected to a pyrometer 49 for reading and control of the furnace temperature.

The condenser 26 has conventional headers 28 and 29 connected by tubes 27 within which the gas is handled. Said tubes are cooled with water entering a space about them from a source 50. The water commonly travels counter-currently to the direction of gas flow, and makes exit from a point such as 51. The header 29 has an outlet 31 for condensate, which may be water or oil, or both. Said condensate passes through a U-tube water seal or liquid seal 32 and drains to a storage or sewage sump 34. Said header 29 also has an outlet for the treated gas of the process at 30, which carries it to a stripping plant 35 where the desired acetylene formed in the process is recovered, as well as other by-products. Said acetylene then issues from a pipe 36 and may be conveyed to a point of storage or use. Likewise, any of the by-product gases extracted are available at an outlet 37 and may be stored or used.

It is understood that this stripping plant diagrammatically shown here may be that disclosed in my application entitled Method and apparatus for separating acetylene from gaseous mixtures, Serial No. 301,402, filed August 22, 1928. Acetylene so available at the outlet 36 may be immediately charged into cylinders, and so for the by-products from the outlet 37. The stripped gas of this process is then conveyed by a pipe 38 to a gas-holder 39, from where it is pumped, as needed, by a blower or pump 41 to different points of use such as the furnace 19 and the steam boiler 15. Suitable interconnection piping 40, 42, 43, and burners 45 and 44 are provided for the purpose. Said burners of course have valves for controlling said stripped gas at its several points of use.

Returning to Fig. 1, the operation of the laboratory scale apparatus is as follows:

The temperature of the furnace as indicated by the pyrometer 20 is brought up to the value desired, normally a temperature in excess of 1500° F. The valve 8 is then opened to admit natural gas or artificial gas or methane at a suitable rate indicated by the meter 7, said rate depending on the size of tube 5, the temperature of the same, the material of the tube, and other factors. Gas thus passes through the gland 9 and enters the tube 5, where it is subjected to heat treatment. This tube may be of nickel or carbon, but is preferably of refractory material such as fused silica, porcelain, carborundum, sillimanite or clay. It is also preferably filled with broken material of the same composition as the tube. The purpose of this filling is to stir the gas and force more rapid treatment in the tube 5, as well as to provide more heating surface for such treatment. The larger the tube the more useful is the presence of a filler. After passage through the heated tube, the reformed gas passes successively through condenser 31, bulb 12, and the gas meter 16. The gas so issuing from the meter will contain considerable percentages of acetylene if the conditions of treatment are balanced. If it is desired to enrich the gas so being treated and so increase the content of acetylene, the valve 26 may be opened to admit any desired proportion of carbureting material. If this material is not already in vapor condition, the heater 28 may be put in operation to assist in the evaporation of the same and its efficient admixture with the methane or natural gas entering as described, before entry into the acetylene forming zone of tube 5.

During the course of operation of my process as above described, there is an accumulation of carbon within the tube 5, which may be cleaned out by admitting air to burn the same away within the more highly heated portions of the tube. But I have found that steam will effectively remove said carbon also without adding the hazard of explosibility. The process of acetylene formation may therefore be interrupted from time to time, while water or steam alone is admitted to the inlet end of tube 5. If the steam is to be superheated, or if the water is to be evaporated, the heater 28 will accomplish either or both. Said steam resulting will then flow through the tube 5 removing carbon, and will then condense in the condenser 31 upon entering the same. It is another advantage of the use of steam over air that there is no dilution of the resulting gases with nitrogen.

I have found that it is also practical to admit steam or water as described, as a cleansing agent, without interrupting the formation of acetylene and without affecting seriously the operation of the process. This carbon removing action can therefore be carried out continuously during formation of acetylene.

Such steam as passes through without reacting with the carbon thus condenses regularly in the condenser 31, together with oil that usually forms. Said condensate collects as before described.

The operation of the large scale apparatus shown in Fig. 2 is as follows:

The furnace 19 is brought up to heat with an auxiliary supply of gas or other fuel. When the pyrometer shows the temperature desired, natural or artificial gas or methane is admitted, as described, at a suitable rate by means of the valve 2, said rate depending on the temperature of the furnace, the size of the tube 18, and the number of such tubes if a plurality is used. The tube 18 is made of any sufficiently refractory material and is preferably filled with broken refractory or lumps which are usually best of the same composition as the tube itself. Carborundum, fused silica, porcelain, and sillimanite are suitable bodies for either the tube or its filler, and I prefer to use carborundum tubes and filler material. Said filler serves to stir the gas being treated and improves materially the operation of my process. The rate of flow of gas also depends on the manner in which the tube 18 is filled, the material of the tube, the amount of carburetion to be used, and a number of other factors. Said gas finds its way to the tube 18 where it undergoes heat treatment. Thereafter it is rapidly cooled in the condenser 26, after which it enters the stripping plant 35 where the acetylene and other desirable by-products are removed. The residual gas or stripped gas consists mainly of hydrogen and methane, which serves as very good fuel for the cracking furnace 19 and for any other heating purpose, such as the formation of steam in the boiler 15. The gas-holder 39 serves to provide latitude in regulation of the different units of the apparatus. If there is a deficiency of such stripped gas as fuel for the needs of the process, there can be an auxiliary supply from another source.

If, as in the case of the apparatus of Fig. 1, it is desired to increase the acetylene content of the treated gas; for instance, if methane is used, or a lean natural gas of little higher hydrocarbon content, carbureting hydrocarbon may be admitted by the valve 9 of Fig. 2 in any desired proportion to the rate of gas flow coming from the pipe 1. Said hydrocarbon, if heavy, is best added in the form of a hot spray, where it mixes effectively with the gas in the mixer 5. Said mixer may be artificially heated, for instance, with internal steam coils, to assist in efficient mixing of the gas and the spray, or the gas can be heated before entry to the mixer 5, or both. There are obviously many ways in which this heat can be introduced, and many combinations of them.

The carbureted gas then enters the treating tube 18 just as before and forms acetylene and other products. The higher the content of higher hydrocarbon in said mixed gas, the greater will be the rate of formation of reformed oil and tar which eventually condenses in the cooler or condenser 26. This oil and tar finds exit through the U-tube 32 and may be conveyed to storage. It may be desirable to treat this oil and tar for valuable by-products, or it might be used as fuel in the furnace, or it can be returned to the system for further carburetion of gas. It may also be used to form artificial gas as in a separate furnace, not shown, and said gas in turn fed to the inlet pipe 1.

If, as in the case of operation of the apparatus of Fig. 1, there is an accumulation of carbon deposit in the tube 18 of Fig. 2, the formation of acetylene can be interrupted by closing off the flow of gas with the valve 2 and the flow of carbureting material with the valve 7. While the tube 18 is still highly heated there can be passed through a flow of air to burn said carbon out. Instead of air, steam may be used to clean said carbon out, by opening the valve 10, and discharging any gas formed to the atmosphere at the far end 29 of the condenser 26, while such steam as is not consumed condenses in the condenser.

I may choose to carry out the steam-cleaning action continuously during the formation of acetylene, with gas flowing from the valve 2, with or without carbureting liquid also flowing at the valve 7.

It will be obvious to experienced chemical engineers that the cleaning action of the steam is that of the water-gas reaction forming carbon monoxide and hydrogen, thus gasifying the carbon for removal. I have found that the presence of a substantial proportion of steam is not detrimental to the formation of acetylene according to my process, and that it is operative in removing carbon while acetylene is being formed.

For the purpose of being specific as to how certain results can be obtained with my process, on a laboratory scale, and in order to substantiate conclusions drawn herein, there will follow below tables of data accompanied by descriptions of the apparatus and the method of its use in securing such data. For all data on tests recorded below, cracking or heat treatment forming acetylene was accomplished at approximately atmospheric pressure.

*Nickel tube tests*

A nickel tube was set up in a vertical position, said tube being of ½" outside diameter and 0.43" inside diameter. This tube was wound with a thin layer of electrically insulating material, and then with a nichrome resistance wire that served as a heating unit. The length of tube so heated was about 14", and a side inlet tube was provided to admit a thermocouple which consisted of 0.02" wire. This thermocouple was so arranged to be in the center of the gas stream at the outlet end and at a point opposite that end of the heating element. In operation, the gas was run downward through the tube for treatment. Said gas, in every case of these tests, was natural gas of the following approximate composition:

| $CH_4$ | Higher hydrocarbons | Olefines | CO | $O_2$ | $H_2$ |
|---|---|---|---|---|---|
| 83.5 | 15.7 | 0.0 | 0.65 | 0.15 | 0.00 |

It was metered before entry into the tube.

Some of the tests were carried out with a smaller nickel tube within the one described, axially centered. This tube was closed at one end, and its purpose was to cut down the ratio of heated volume to heated surface and so study the effect of time of treatment. This inner tube measured 0.235" outside diameter, and it extended the length of the zone wound with resistance wire. There was thus an annular passage formed in which the natural gas was treated.

It was found that this arrangement would indicate lower temperatures than the maximum within the tube, especially with the slower flows of gas which did not carry the maximum gas temperature down to the point of measurement. For this reason the amperage was also read as a further check on the amount of heat being applied to the tube.

*Explanation of captions*

"Test No." refers to the number of the test as in my original records.

"Inner tube" shows whether the inner tube was used or not.

"Flow rate" is the rate of flow of the incoming natural gas in cu. ft. per hour as measured at room temperature and one atmosphere pressure.

"%$C_2H_2$" gives the percentage of acetylene by volume in the treated gas.

"Time run" is the length of time seconds that the gas was run through in the particular test.

The meaning of remaining captions is obvious.

Table 1.—*Showing results of treatment of natural gas*

| Test No. | Inner tube | Amperes | Temperature | Flow rate | % C₂H₂ | Gas color | Time run |
|---|---|---|---|---|---|---|---|
| 2 | No | 4.8 | 1550 F. | 3.36 | 2.6 | White | |
| 4 | No | 4.6 | 1535 | 3.30 | .19 | Clear | |
| 6 | No | 4.6 | 1440 | 2.69 | <.03 | Clear | |
| 8 | No | 4.6 | 1425 | 2.19 | <.03 | Clear | 90″ |
| 10 | No | 4.6 | 1435 | 1.67 | .00 | | |
| 11 | No | 4.6 | 1410 | 6.09 | .00 | Clear | |
| 13 | Yes | 4.6 | 1420 | 6.09 | .00 | Clear | |
| 14 | Yes | 4.6 | | 3.25 | .00 | | |
| 15 | Yes | 4.7 | 1510 | 3.19 | <.01 | | 120″ |
| 16 | No | 4.72 | 1515 | 6.19 | .01 | Clear | *120″ |
| 17 | No | 4.72 | 1455 | 7.84 | .00 | Clear | 60″ |
| 18 | No | 4.72 | 1450 | 9.21 | .01 | Clear | 60″ |
| 19 | No | 4.70 | 1410 | 11.28 | .01 | Clear | 120″ |
| 20 | No | 4.80 | 1445 | 11.36 | .026 | Clear | 120″ |
| 21 | No | 4.83 | 1475 | 9.33 | .039 | Clear | 120″ |
| 22 | No | 4.80 | 1620 | 6.22 | .36 | Yellow | 120″ |
| 23 | No | 4.80 | 1680 | 3.27 | .38 | Yellow | 120″ |
| 24 | No | 4.8 | 1665 | 2.86 | .71 | Yellow | 90″ |
| 25 | No | 4.8 | 1560 | 2.22 | 1.15 | Yellow | |
| 26 | No | 4.8 | 1540 | 1.74 | 1.14 | | 185″ |
| 27 | No | 4.8 | 1520 | 1.45 | .52 | Yellow | 180″ |
| 28 | Yes | 4.8 | *1470 | 1.99 | .00 | Clear | 120″ |
| 29 | Yes | 4.8 | 1700 | 6.16 | .65 | Gray | 120″ |
| 30 | Yes | 4.6 | 1685 | 9.09 | .10 | White | 120″ |
| 31 | Yes | 4.82 | 1700 | 11.23 | .88 | White | 120″ |
| 32 | Yes | 4.80 | 1720 | 13.78 | .50 | Clear | 90″ |
| 33 | Yes | 4.80 | 1700 | 8.24 | 1.07 | White | 120″ |
| 34 | Yes | 4.82 | 1665 | 6.59 | *3. | White | 120″ |
| 35 | Yes | 4.79 | 1630 | 5.67 | 2.85 | White | 120″ |
| 36 | Yes | 4.80 | 1635 | 7.62 | 2.68 | White | 120″ |
| 37 | Yes | 4.82 | 1670 | 6.64 | 2.85 | White | 120″ |
| 38 | Yes | 4.80 | 1670 | 6.42 | 1.33 | Yellow | 120″ |
| 39 | Yes | 4.82 | 1580 | 3.29 | 3.09 | Yellow | 120″ |
| 40 | Yes | 4.78 | 1530 | 2.25 | 3.63 | Yellow | |
| 41 | Yes | 4.78 | 1445 | 1.52 | 2.78 | Yellow | 150″ |
| 42 | Yes | 4.90 | 1605 | 3.25 | 3.77 | Yellow | 120″ |
| 43 | Yes | 4.90 | 1710 | 6.48 | 3.86 | Yellow | 120″ |
| 44 | Yes | 4.90 | 1550 | 2.28 | 3.41 | Yellow | 120″ |
| 45 | Yes | 4.92 | 1510 | 1.86 | 3.01 | Yellow | 120″ |
| 46 | Yes | 4.80 | 1845 | 8.84 | 2.34 | White | 120″ |
| 47 | Yes | 4.80 | <1840 | 10.89 | .82 | White | 120″ |

(*)—Approximately.

After it was found that larger percentages of acetylene could be expected from use of higher temperatures, and since the nickel tube with the nichrome heating element would not stand higher temperatures, a new arrangement was set up as follows. A carbon tube of $\frac{7}{16}$″ o. d. was drilled out with a $\frac{7}{32}$″ hole. This was done by using an arc carbon that had a soft core of this diameter, which was removed to form the hole. Two clamp type copper electrodes were made to fit the outside of this tube, and arranged to be water-cooled. The tube itself was imbedded in a lamp-black and diatomaceous earth mixture held in a brass box with asbestos ends, except the very ends of it which protruded to allow for connections for gas. The electrodes were also contained in the box of lamp-black. The tube thus served as its own electrical heating element. This protection of the tube prevented its burning away on account of high temperature and contact with the atmosphere. This tube was heated for a length of about 9½ inches. Tests below were all carried out at a total pressure of approximately one atmosphere absolute.

Some of the data had best be given descriptively. Flow rates are given in cu. ft. per hr. at room temperature and atmospheric pressure as measured on the ingoing gas. Acetlyene content is given in volume percentage.

48 With a flow of 4.42 ft. per hour of gas, and a yellow heat on the tube, I had 5.41% acetylene.

49 With the same resistance setting on the tube, and a flow of 6.41 ft. per hour there was an acetylene content of 5.94%.

51 With the same resistance setting as above and a flow of 8.11 ft. per hour, there was an acetylene percentage of 6.93%.

52 With the same resistance setting again, and a flow of 9.94 ft. per hour, the acetylene percentage was 7.82%.

56 At the same heat again and a flow of 12.33 ft. per hour, the acetylene percentage was 3.01%.

57 At the same heat and a flow of 11.11 ft. per hour, the acetylene percentage was 7.24%.

58 At the same heat and a flow of 9.94 ft. per hour a check on test #52 above, the acetylene was 8.80%.

In all the tests above the electrodes were 9.75″ apart. For all tests below they were 9.50″ apart.

59 With substantially less resistance in series with the primary than in the above set of tests, meaning a hotter tube, and at a flow of 9.94 ft. per hour, the acetylene was 8.62%.

60 Same heat as in #59, flow of 11.11 cu. ft. per hour, analysis 9.11% acetylene.

61 Same heat as in #59, flow of 12.18 cu. ft. per hour, analysis 8.11% acetylene.

62 Still hotter tube than in #59, flow of 9.94 cu. ft. per hour, analysis 10.65% acetylene.

63 Still hotter tube than in #62, flow of 9.94 cu. ft. per hour, analysis 10.2% acetylene. I found that the fused silica tube peep-hole that had had its end resting against the mid-portion of the carbon tube had been rounded by this time. This would indicate a temperature of at least 3100° F. for test #63.

71 Unknown but fairly high temperature, and a flow of 10.84 cu. ft. per hour gave an acetylene content of 5.94%. The density of the treated gas here formed containing the acetylene was determined with a Bunsen diffusometer and showed 0.418 with air taken as unity. Analysis of the natural gas treated showed as follows:

| CO₂ | O₂ | Illuminants | Higher hydrocarbons | CH₄ | N₂ |
|---|---|---|---|---|---|
| 0.72 | 1.23 | 1.69 | 15.44 | 80.9 | 0.0 |

Density of the natural gas determined the same day with a Bunsen diffusometer shows 0.671 in reference to air.

70 With the same resistance setting as in #71, and a flow of 10.68 cu. ft. per hour, which makes it the same as the last test, there was an acetylene content of 5.00%. A sample of this same treated gas containing the acetylene showed the following complete analysis:

| $CO_2$ | $O_2$ | Illuminants | $H_2$ | CO | $CH_4$ | $C_2H_6$ | $N_2$ |
|---|---|---|---|---|---|---|---|
| 0.70 | 0.46 | 12.40 | 29.65 | 1.69 | 51.2 | 0.00 | 3.91 | which shows definitely that all the higher hydrocarbon constituents have been decomposed. The item called illuminants includes the 5% of acetylene given above. This process for forming acetylene therefore also forms valuable unsaturated hydrocarbon constituents.

From a determination in the case of this test #70 it was also found out that the gas upon being cracked underwent an expansion of 50%; that is, that for every 1 cubic foot of gas treated there are formed 1.5 feet of treated gas. This fact, together with the analysis of the gas treated and of the treated gas, indicates that during this cracking there is either no methane cracked, or there is as much more formed from the higher hydrocarbons in the process to make the total quantity of treated gas have the same amount of methane as the original natural gas. This is good evidence that the methane is substantially an inconvertible gas for just this condition of cracking used and the short time of treatment. It is probably true enough that if the methane is subjected to the same temperature of the test for a much longer time that it would also decompose. The explanation is that the methane has a much slower rate of decomposition than ethane under the same conditions of treatment. A statement of this fact may also be found in an article by Bone and Coward (Journal Chemical Society (London) 1908, vol. 93, Transactions II, pages 1197-1225 inclusive) though the tests they made to base it on were not carried out in a mixture but separately with the two gases. I believe that there is an extra increase in the rate of higher hydrocarbon decomposition where it is allowed to decompose at a small absolute pressure as exists in any case where it is diluted as in my test here described. Briefly, if there is a certain rate difference in decomposition shown by separate treatment of methane and another gaseous hydrocarbon under identical conditions of time and temperature, there is a larger difference in the mixture comprising natural gas for the reason that the higher hydrocarbon there present is highly diluted with methane and the methane is only slightly diluted with higher hydrocarbon, dilution in either case increasing the rate of decomposition from what it is at atmospheric pressure.

This restriction of decomposition to the higher hydrocarbon has bearing on the procedure of bubbling natural gas through a liquid hydrocarbon of appreciable vapor pressure for the purpose of increasing the content of higher hydrocarbons so capable of producing acetylene, and increasing the percentage of acetylene in the treated gas. It has the additional advantage that it is known that the higher the hydrocarbon the more easily it is decomposed, or the greater the rate of decomposition with reference to methane. So if the hydrocarbons already present in natural gas of the composition that I used are responsible for the formation of acetylene, then addition of vapors of liquid hydrocarbon to the natural gas or to methane would give still more easily decomposable constituents and a greater difference between these constituents and methane, as to rate of decomposition.

Further tests with the carbon tube were also carried out. Here temperatures were read for the most part by a platinum platinum-rhodium thermocouple of 0.02" wire inserted from the exit end of the carbon tube and reaching to within 2¼" of the center of the tube. It was thought that because of the direction of flow of gas the thermocouple might be more likely to show the maximum temperature, than if it were inserted to the center of the tube where it would be the hottest without gas flowing.

| Test No. | Gas flow cu. ft. per hour | Pyrometer | % acetylene by volume formed |
|---|---|---|---|
| 98 | 10.58 | 2045° F. | 0.79 |
| 99 | 10.58 | 2165 | 1.68 |
| 100 | 10.58 | 2147 | 1.92 |
| 101 | 10.58 | 2240 | 2.91 |
| 102 | 10.58 | 2280 | 1.10 |
| 103 | 10.58 | 2435 | 2.62 |
| 104 | 10.58 | 2540 | 3.34 |
| 105 | 10.58 | 2590 | 4.71 |
| 106 | 10.58 | 2645 | 6.63 |
| 107 | 10.58 | 2270 | 1.35 |
| 108 | 10.58 | 2435 | 2.36 |
| 109 | 10.58 | 2590 | 3.24 |
| 110 | 10.58 | 2780 | 4.83 |
| 111 | 10.58 | 2946 | 5.71 |
| 112 | 10.58 | 2660 | 3.63 |

These figures show also an increase in acetylene with increasing temperature, although the two series 98 to 106 and 107 to 112 are not consistent throughout. The experiments were performed as they are numbered and listed, however, and are quite consistent in either series alone.

Further tests were made to show if it is the higher hydrocarbon content of the natural gas that is forming the acetylene.

I prepared several cubic feet of pure methane from natural gas by removing chemically the carbon dioxide and the water vapor, and fractionating with the help of the low temperature of liquid oxygen, the remaining mixture of methane and heavier hydrocarbon gases, in a specially constructed column for the purpose, drawing off the residual methane relatively pure with a vacuum pump and delivering it to a gas holder. I made a gas density test of the gas so collected on the same day and found a value of 0.564 by the diffusometer mentioned before, as compared to air. Pure methane should have shown a density of 0.559 which shows me that it was substantially pure methane, especially in view of the fact that the natural gas contains some nitrogen which would not have been removed by the treatment given. Further, the density of natural gas according to my tests had always run about 0.671 referred to air as before. In mentioning the residual content of nitrogen it may be said that nitrogen, being heavier than methane in the ratio of 1.74 to 1.00, would easily raise the density of the methane prepared, although it contained no other impurities.

Using the carbon tube described earlier, and comparing raw natural gas with the methane, both at a total pressure of one atmosphere absolute, by using a single setting on the resistance controlling the tube temperature, and so assuming that the temperature of the two tests would be the same, the following resulted:

{ #74 Flow of 11.20 ft. per hour, acetylene 1.44% (methane).
75 Flow of 10.30 ft. per hour, acetylene 3.69% (natural gas).

{ #80 Flow of 11.70 ft. per hours, acetylene 1.65 (methane).
81 Flow of 10.75 ft. per hour, acetylene 4.11 (natural gas).

{ #85 Flow of 10.70 ft. per hour, acetylene 0.48 (methane).
87 Flow of 10.75 ft. per hour, acetylene 6.20 (natural gas).

Flow rates are given in terms of entering gas, at one atmosphere and room temperature.

Among the above, comparable tests carried out with the same resistance setting are set in brackets.

I analyzed with a Burrell unit the methane gas with which the above tests were carried out, which bore out that there was about 3% of illuminants or unsaturated hydrocarbon content and no saturated higher hydrocarbon which I hoped I had removed in the fractionation method of methane preparation mentioned. Oxygen content was about 0.35% which if taken to have the fourfold proportion of nitrogen as would be the case if the oxygen present were due to air impurity, would indicate 1.4% of nitrogen. This content of nitrogen would raise the density of pure methane from 0.558 to 0.563. This would correct the above, but the illuminants here present would make the density too high if they were corrected for similarity. The fact does remain, however, that there is much less heavy hydrocarbon, whether illuminants or saturated paraffin gases, in the prepared methane than in the natural gas with which it was compared in the tests just given as to capacity for acetylene formation. Also these particular comparative tests as set in brackets were carried out as soon after each other as was possible without intervention of other tests and without cooling the tube from one test to the next. It is obvious how much more readily under the same conditions natural gas makes acetylene than does methane.

I made a few tests using the methane fractionated and analyzed as described and adding to it a considerable percentage of hydrocarbon vapor whose composition corresponded to hexane approximately. This sample of wild gas used was obtained from the General Petroleum Corporation for the purpose. The data given for the constants of this material are as follows:

Gravity _____ 83.8
Initial b. p_____ 60 F.
20% distilled _____ 105 F.
50% distilled_____ 166 F.
And final_____ 180 F.

It is of course a mixture of different hydrocarbons, but probably has a larger percentage of hexane than any other constituent. The tests were carried out by using the carbon tube earlier described with a thermocouple inserted in the gas stream from the exit end. The methane was first measured before mixing with the vapor. The mixture was passed through the carbon tube and the temperature read. Total pressure was again one atmosphere absolute.

Preliminary tests were carried out with methane alone to compare with the mixture. Immediately below is a table of tests for pure methane:

| Test No. | Flow cu. ft per hr. | Temp. °F. | Acetylene % | Time run |
|---|---|---|---|---|
| 85 | 11.10 | 1660 | 0.48 | 45" |
| 86 | 13.22 | 1680 | 0.62 | 30" |

Comparative test on natural gas to be discussed:

| Test No. | Methane flow cu. ft. per hr. | Temp. °F. | Acetylene % | Time run |
|---|---|---|---|---|
| 87 | 10.90 | 1700 | 6.20 | 15" |

Just below are the tests on the mixture:

| Test No. | Methane flow cu. ft. per hr | Temp. °F. | Acetylene % | Time run |
|---|---|---|---|---|
| 88 | 8.00 | 1670 | 1.34 | 30" |
| 89 | 6.27 | 1670 | 2.74 | 15 |
| 90 | 4.94 | 1670 | 2.20 | 45 |
| 91 | 3.48 | 1670 | 3.09 | 45 |
| 92 | 2.25 | 1670 | 4.51 | 45 |
| 93 | 1.67 | 1670 | 7.89 | 30 |

Subsequently I determined that in these tests the volume percent of the wild gas was about 60. In the last table, then, to get the actual rate of flow of mixed gas the methane flow is to be multiplied by about 2.5.

Discussion

It is seen again in tests 85 and 87 that the methane under the same condition as natural gas gives much poorer results. Methane mixed with wild gas vapor gives up to 7.9% as in test 93 at the same temperature.

Time of heating, as may be computed from the data given above, ranged from 0.017 to .60 seconds. This is a practical range, though acetylene will form more slowly by using lower temperatures, and much more rapidly by using higher temperatures. It should be withdrawn as soon as formed, and so for higher temperatures, the time of heating should be accordingly shorter. It is possible to make acetylene at temperatures between 1500 and 3600 F. and higher, and the time required for operation in this temperature range will vary from some five seconds to as little as 2/1000 second. The time of heating will be affected at any one temperature by the size and arrangement of the heating chamber, and all the auxiliary factors influencing the rate at which the heat being applied can be made to reach the gas being treated for formation of acetylene.

The general conclusions are that the higher the temperature the higher the percent of acetylene for natural gas; that under the same conditions as given, natural gas yields a larger percentage than methane; and that a mixture of methane and vapor of normally liquid hydrocarbons yields a larger percentage of acetylene than does methane.

I claim as my invention:

1. A process of producing a mixture of gases containing at least two per cent of acetylene, which comprises: subjecting a gaseous mixture, containing substantial amounts of hydrocarbon other than acetylene and heavier than methane, to a temperature in excess of 1500° F., said gaseous mixture being at substantially atmospheric pressure, for a period not in excess of five seconds; and rapidly cooling the heated mixture to a temperature at which acetylene is stable.

2. A process of producing a mixture of gases containing at least two per cent of acetylene, which comprises: subjecting a gaseous mixture, containing substantial amounts of hydrocarbon other than acetylene and heavier than methane, and liquid at atmospheric temperatures and pressures, to a temperature in excess of 1500° F., said gaseous mixture being at substantially atmospheric pressure, for a period not in excess of five seconds; and rapidly cooling the heated mixture to a temperature at which acetylene is stable.

3. A process of producing a mixture of gases containing at least two per cent of acetylene, which comprises: subjecting a gaseous mixture containing substantial amounts of hydrocarbon other than acetylene and heavier than methane such as gasoline, casinghead gas, ethane, ethylene, kerosene, benzine, ligroin, benzol, toluol, or the like, to a temperature preferably considerably in excess of 1500° F., said gaseous mixture being maintained at substantially atmospheric pressure during said heating, for a period not in excess of five seconds; and thereafter rapidly cooling the mixture to a temperature at which acetylene is stable.

4. A process of producing a mixture of gases containing at least two per cent of acetylene, which comprises: subjecting a gaseous mixture, limited substantially to hydrocarbon gases and containing substantial amounts of hydrocarbon other than acetylene and heavier than methane, to a temperature in excess of 1500° F., said gaseous mixture being at substantially atmospheric pressure, for a period not in excess of five seconds; and rapidly cooling the heated mixture to a temperature at which acetylene is stable.

5. A process of producing a mixture of gases containing at least two per cent of acetylene, which comprises: subjecting a gaseous mixture, limited substantially to hydrocarbon gases and containing substantial amounts of hydrocarbon other than acetylene and heavier than methane, and liquid at atmospheric temperatures and pressures, to a temperature in excess of 1500° F., said gaseous mixture being at substantially atmospheric pressure, for a period not in excess of five seconds; and rapidly cooling the heated mixture to a temperature at which acetylene is stable.

6. A process of producing a mixture of gases containing at least two per cent of acetylene, which comprises: subjecting a gaseous mixture, limited substantially to hydrocarbon gases and containing substantial amounts of hydrocarbon other than acetylene and heavier than methane, such as gasoline, casinghead gas, ethane, ethylene, kerosene, benzine, ligroin, benzol, toluol, or the like to a temperature preferably considerably in excess of 1500° F., said gaseous mixture being maintained at substantially atmospheric pressure during said heating, for a period not in excess of five seconds; and thereafter rapidly cooling the mixture to a temperature at which acetylene is stable.

In testimony whereof, I have hereunto set my hand at Los Angeles, California, this 25th day of September, 1928.

ROBERT G. WULFF.